United States Patent
Takeuchi et al.

(10) Patent No.: US 10,270,232 B2
(45) Date of Patent: Apr. 23, 2019

(54) APPARATUS FOR INSTALLING CABLES IN SPLIT SLEEVE

(71) Applicant: Go!Foton Holdings, Inc., Somerset, NJ (US)

(72) Inventors: Kenichiro Takeuchi, North Brunswick, NJ (US); Haiguang Lu, Los Altos, CA (US)

(73) Assignee: Go!Foton Holdings, Inc., Somerset, NJ (US)

( * ) Notice: Subject to any disclaimer, the term of this patent is extended or adjusted under 35 U.S.C. 154(b) by 783 days.

(21) Appl. No.: 14/750,335

(22) Filed: Jun. 25, 2015

(65) Prior Publication Data

US 2016/0375567 A1    Dec. 29, 2016

(51) Int. Cl.
   B23P 19/02    (2006.01)
   H02G 1/08    (2006.01)

(52) U.S. Cl.
   CPC .................. H02G 1/085 (2013.01)

(58) Field of Classification Search
   USPC .................. 29/235, 755, 758, 760
   See application file for complete search history.

(56) References Cited

U.S. PATENT DOCUMENTS

| | | | |
|---|---|---|---|
| 396,677 A * | 1/1889 | Zimmerman | F16L 3/04 248/216.4 |
| 2,519,987 A * | 8/1950 | Wernette | D06F 55/00 24/561 |
| 4,120,289 A * | 10/1978 | Bottum | F24D 11/003 126/586 |
| 4,593,442 A | 6/1986 | Wright et al. | |
| 5,316,247 A | 5/1994 | Wodka | |
| 6,550,137 B1 | 4/2003 | Ferrand | |

(Continued)

FOREIGN PATENT DOCUMENTS

| | | |
|---|---|---|
| EP | 1941825 A2 | 7/2008 |
| JP | H0374123 A | 3/1991 |
| WO | 2008080518 A1 | 7/2008 |

OTHER PUBLICATIONS

Feed Master, Inc., Installation Made Easy Brochure, Exact publication date unknown, but published before Jun. 5, 2015, 2 pages.

(Continued)

*Primary Examiner* — Joseph J Hail
*Assistant Examiner* — Shantese McDonald
(74) *Attorney, Agent, or Firm* — Lerner, David, Littenberg, Krumholz & Mentlik, LLP

(57) ABSTRACT

A tool for installing cables in a split sleeve includes first and second guide portions, a third arcuate guide portion extending from and positioned radially outward of the first guide portion, the first and third guide portions forming a first guide slot therebetween, and a fourth arcuate guide portion extending from and positioned radially outward of the second guide portion, the second and fourth guide portions forming a second guide slot therebetween. The tool may be assembled to a split sleeve that is biased toward a rolled up configuration in which one side of the split sleeve at least partially overlies another side of the split sleeve. By positioning one or more cables within the tool while the tool is assembled to the split sleeve, a user may slide the tool along the split sleeve to position the cables within the split sleeve.

10 Claims, 13 Drawing Sheets

(56) References Cited

U.S. PATENT DOCUMENTS

| | | | |
|---|---|---|---|
| 6,655,014 B1 | 12/2003 | Babini | |
| 7,183,489 B2 * | 2/2007 | Kossak | H01R 4/186 174/84 C |
| 8,776,782 B2 * | 7/2014 | McEntee | F24J 2/055 126/652 |
| 2003/0173555 A1 | 9/2003 | Supkis et al. | |
| 2005/0048640 A1 * | 3/2005 | Kennedy | A61M 5/1418 435/283.1 |
| 2010/0065797 A1 | 3/2010 | Stenger et al. | |

OTHER PUBLICATIONS

ISR for Application PCT/US2016/039031—dated Sep. 8, 2016.
Extended European Search Report including Written Opinion, for EP Application No. 16815307.0, dated May 15, 2018.

\* cited by examiner

APPARATUS FOR INSTALLING CABLES IN SPLIT SLEEVE

BACKGROUND

In systems that employ a cable, and particularly those that employ a plurality of cables running along a similar pathway, it is often desirable to provide tubing or a sleeve to surround the cables. A sleeve may provide protection to the cables running through the sleeve. In addition, surrounding a plurality of cables with the sleeve may provide for increased organization of the system, for example by keeping each of the plurality cables within a volume bounded by the sleeve.

One type of sleeve that may be positioned over cables in a system is a split sleeve. Generally, a split sleeve is a sleeve with an opening (or "split") positioned along the longitudinal axis of the sleeve. This allows for the split sleeve to be wrapped around the cables, which may be more desirable than passing the cables through an open terminal end of the sleeve. For example, in some systems, it is preferable to position the cables within the sleeve only after the cables have been connected to their respective components. Using the split sleeve also allows for the cables to be easily removed from the split sleeve in case maintenance or replacement of the cables is required.

However, in order to maintain these and other benefits of positioning the cables within the sleeve, it is preferable that the cables remain securely positioned within the sleeve and do not exit through the longitudinal opening in the split sleeve. To keep the cables secured within the split sleeve, the split sleeve may be formed of a material that is configured such that opposing longitudinally extending sides have a bias so as to tend to move toward and roll up on each other in the absence of externally applied forces. With this configuration, once the split sleeve is wrapped around the cables, the sides of the sleeve will roll up on each other, effectively "closing" the longitudinal opening, and secure the cables therein with little chance that one or more cables may unintentionally exit the sleeve through the longitudinal opening. However, because the sides of the split sleeve tend to roll up on each other in the absence of externally applied forces, it may be difficult to quickly insert the cables into the split sleeve through the longitudinal opening. Thus, it would be desirable for a tool to facilitate the rapid and reliable insertion of one or more cables into a split sleeve.

BRIEF SUMMARY

According to a first aspect of the disclosure a tool for installing cables in a split sleeve includes first and second guide portions. The tool may also include a third arcuate guide portion extending from and positioned radially outward of the first guide portion, the first and third guide portions forming a first guide slot therebetween. The tool may further include a fourth arcuate guide portion extending from and positioned radially outward of the second guide portion, the second and fourth guide portions forming a second guide slot therebetween. The third and fourth guide portions may be joined at respective first ends. The third and fourth guide portions may include respective second ends opposite the first ends which are spaced apart. The second ends, with respective third ends of the first and second guide portions which are spaced art, defining a cable slot. Alternatively, the third and fourth guide portions may be spaced apart at respective first ends, with the third and fourth guide portions including respective second ends opposite the first ends which are spaced apart, and the second ends, with respective third ends of the first and second guide portions, defining a cable slot.

According to a second aspect of the disclosure, a tool for installing cables in a split sleeve includes a center portion having first and second arcuate lateral extensions. A first arcuate guide portion may extend from and be positioned radially outward of the first lateral extension, the first guide portion and first lateral extension forming a first guide slot therebetween. A second arcuate guide portion may extend from and be positioned radially outward of the second lateral extension, the second guide portion and second lateral extension forming a second guide slot therebetween. The first and second lateral extensions and first and second guide portions may each define an arc segment of a circle. The first guide portion may be connected to the first lateral extension by a first connection portion, and the second guide portion may be connected to the second lateral extension by a second connection portion. The first and second connection portions may be spaced apart from one another to form a cable slot for receiving one or more cables therethrough. At least one resilient flap may extend away from at least one of the first connection portion or the second connection portion. The at least one resilient flap may be configured to deflect toward or away from the cable slot. The at least one resilient flap may include a first resilient flap extending from the first connection portion toward the second connection portion and a second resilient flap extending from the second connection portion toward the first connection portion, and the first and second resilient flaps may not be coupled to each other within the cable slot. A terminal end of the first guide portion, a terminal end of the second guide portion, and a bottom of the center portion may be positioned in a single plane. The first guide slot may be bounded on one side by the first connection portion and the second guide slot may be bounded on one side by the second connection portion. A third arcuate guide portion may be positioned radially outward of the first lateral extension, the first and third guide portions forming the first guide slot with the first lateral extension. A fourth arcuate guide portion may be positioned radially outward of the second lateral extension, the second and fourth guide portions forming the second guide slot with the second lateral extension. The first and third guide portions may be spaced apart from one another and may form a first sleeve slot therebetween, and the second and fourth guide portions may be spaced apart from one another and may form a second sleeve slot therebetween.

According to a third aspect of the disclosure, a system for securing one or more cables, includes a split sleeve and a tool. The split sleeve may extend longitudinally from a first terminal end to a second terminal end and transversely from a first side to a second side, and the split sleeve may be biased to a configuration in which the first side at least partially overlies the second side in the absence of externally applied force. The tool may be configured to be assembled to the split sleeve. The tool may have a center portion having first and second arcuate lateral extensions. The tool may also have a first arcuate guide portion positioned radially outward of the first lateral extension, the first guide portion and first lateral extension forming a first guide slot therebetween. A second arcuate guide portion may be positioned radially outward of the second lateral extension, the second guide portion and second lateral extension forming a second guide slot therebetween. When the split sleeve is assembled to the tool, the first guide slot is configured to slide along the first side of the split sleeve and the second guide slot is configured to slide along the second side of the split sleeve. The first guide portion may be connected to the first lateral extension by a first connection portion, and the second guide portion may be connected to the second lateral extension by a second connection portion. When the tool is assembled to the split sleeve, a portion of the first side of the split sleeve may be positioned adjacent the first connection portion, and a portion of the second side of the split sleeve may be positioned adjacent the second connection portion. When the tool is assembled to the split sleeve, a portion of the split sleeve between the first and second sides may be bounded on only one side by the tool. When the tool is assembled to the split sleeve, a cable slot may be defined between the first and second connection portions and may extend between the portions of the first and second sides of the split sleeve, and the cable slot is for receiving one or more cables therethrough. At least one resilient flap may extend away from at least one of the first connection portion or the second connection portion. The at least one flap may be configured to deflect toward or away from the cable slot. The at least one resilient flap may include a first resilient flap extending from the first connection portion toward the second connection portion and a second resilient flap extending from the second resilient flap extending from the second connection portion toward the first connection portion, wherein the first and second resilient flaps are not coupled to each other within the cable slot. The first terminal end of the split sleeve may have a first thickness, the second terminal end of the split sleeve may have a second thickness, and a middle portion of the split sleeve between the first and second terminal ends may have a third thickness, the first and second thickness being greater than the third thickness. The first and second guide slots may each have a width greater than the third thickness and less than the first and second thicknesses.

DETAILED DESCRIPTION

Figure 1A:
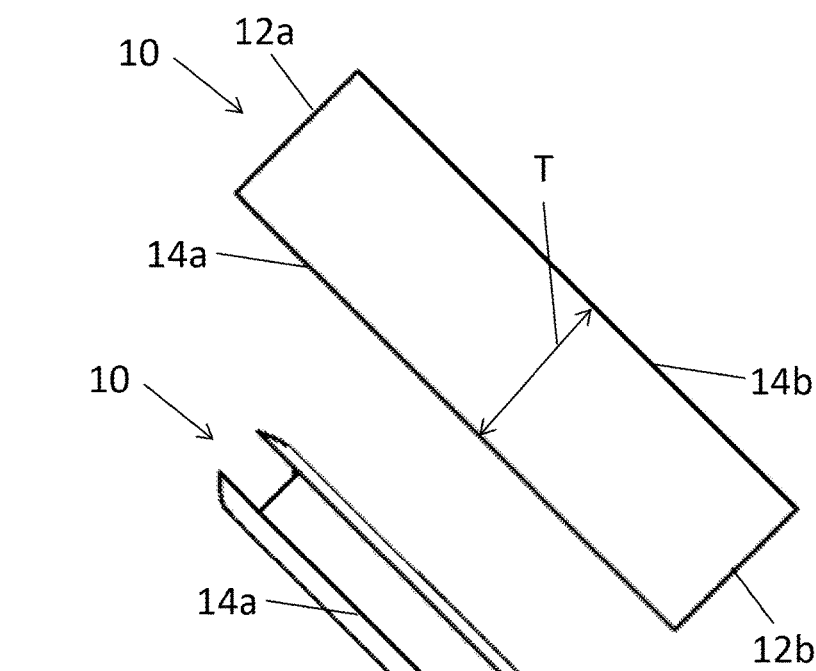
FIG. 1A is a perspective view of a split sleeve laid out flat.

FIG. 1A shows a split sleeve 10 according to the prior art, with the split sleeve laid out in a flattened condition. Split sleeve 10, as shown in the flattened condition, may be substantially rectangular having opposed terminal ends 12a and 12b at opposite longitudinal ends of the split sleeve, two sides 14a and 14b at opposite transverse ends of the split sleeve and a transverse dimension T extending from the side 14a to the side 14B. Split sleeve 10 may be formed of any suitable material, such as a braided fabric or polymer, and is preferably a material capable of shape memory. For example, split sleeve 10 may be formed of a material that can be shape-set via heating. By rolling split sleeve 10 over a mandrel or other device and heating the split sleeve to a suitable temperature, the shape of the split sleeve is heat-set so that, in the absence of externally applied forces, the split sleeve tends to return to the heat-set shape.

Figure 1B:
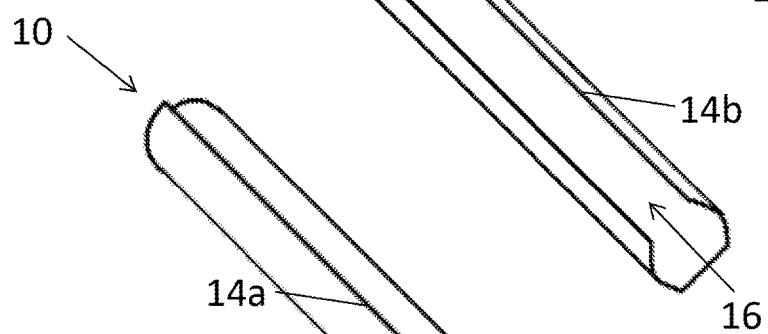
FIG. 1B is a perspective view of the split sleeve of FIG. 1A in a partially relaxed condition.
Figure 1C:
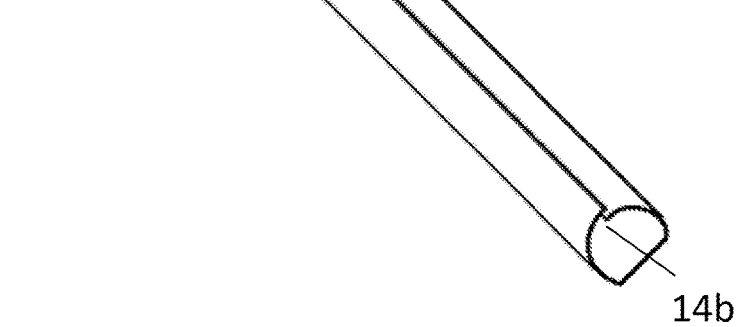
FIG. 1C is a perspective view of the split sleeve of FIG. 1A in a fully relaxed condition.

In one example for use with cable protection and organization, split sleeve 10 may be shape set so that, in the absence of externally applied forces, side 14a of the split sleeve overlies side 14b. FIG. 1B shows split sleeve 10 with this shape-set configuration in a partially relaxed condition with sides 14a and 14b partially rolled toward another. An opening (or "split") 16 is formed along the longitudinal axis of split sleeve 10 between sides 14a and 14b, which allows for inserting cables into, or removing cables from, the split sleeve. In the absence of externally applied forces, split sleeve 10 is in a fully relaxed condition, with side 14a overlying side 14b, as shown in FIG. 1C. In this fully relaxed condition, opening 16 is effectively closed so that cables positioned within split sleeve 10 are secured therein, with little chance of any cables unintentionally exiting from the split sleeve between sides 14a and 14b.

It should be understood that the partially relaxed condition, shown in FIG. 1B, may be difficult for a user to attain in practice. For example, if split sleeve 10 has a length greater than a few inches, it may be difficult, if not impossible, for a user to grip along the entire length of sides 14a and 14b to hold them apart to create opening 16. Rather, if split sleeve 10 has any substantial length, the portions of sides 14a and 14b not gripped by the user at any given time will tend to roll up on one another, such that opening 16 generally only exists in the split sleeve between the particular portions of sides 14a and 14b being actively gripped by the user. Because of this, it may be difficult and/or take a long time for a user to insert a plurality of cables into an interior of split sleeve 10 by providing for the opening 16, and the user may have to manipulate the sides 14a and 14b of the split sleeve to create opening 16 while simultaneously manipulating the cables to insert them through the opening. An example of a split sleeve that may be used in conjunction with tools described below is 5/16" F6 Woven Wrap manufactured by TechFlex, Inc. of Sparta, N.J.

Figure 2A:
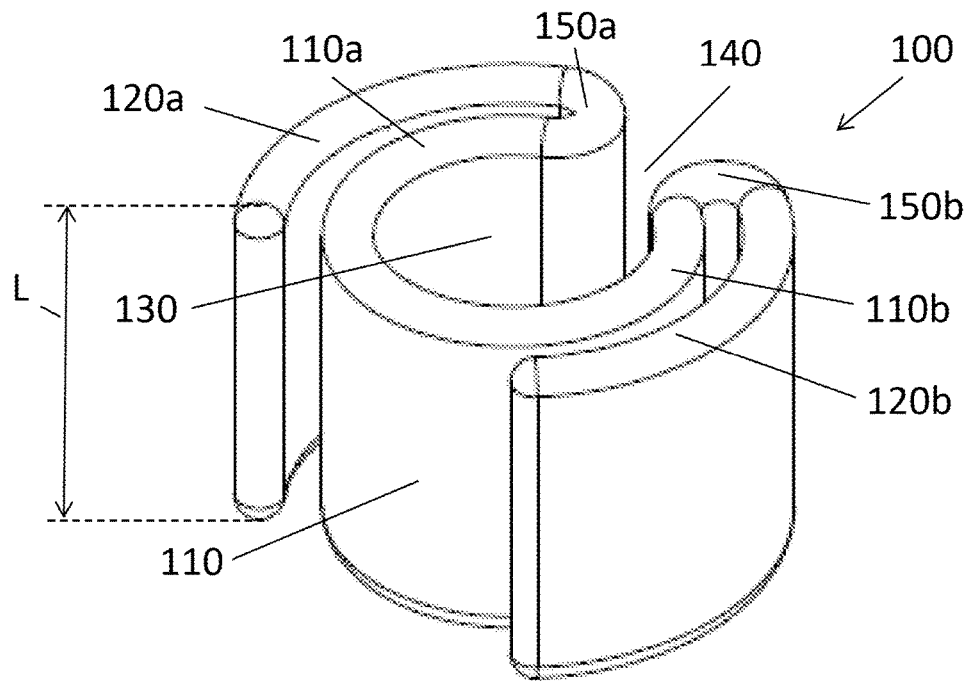
FIG. 2A is a perspective view of a tool for installing cables in a split sleeve according to one embodiment of the disclosure.
Figure 2B:
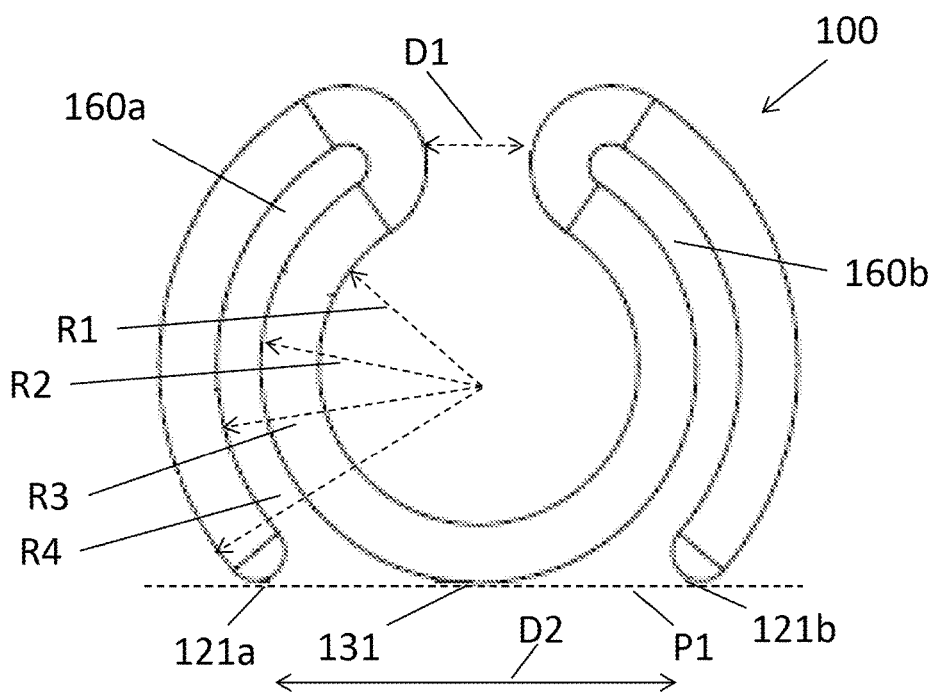
FIG. 2B a transverse cross-section of the tool of FIG. 2A.

FIGS. 2A-B show a tool 100 for installing cables into a split sleeve, such as split sleeve 10 described above. Tool 100 may include a center portion 110 and lateral guide portions 120a, 120b connected to and positioned radially outward of the center portion. Center portion 110 defines a lumen 130 extending a length L coextensive with a longitudinal dimension of the center portion. Center portion 110 may be in the form of an open tube in the general shape of a "U" or "C", including lateral extensions 110a, 110b. Lateral extensions 110a, 110b are joined at one end (the "bottom" end in the view of FIG. 2B) but not at the other end (the "top" end in the view of FIG. 2B). At the end at which lateral extensions 110a, 110b are not joined, a cable slot 140 is defined, the slot extending longitudinally the length L of center portion 110, the slot being in communication with lumen 130. As best shown in FIG. 2B, a cross-section of center portion 110, including lateral extensions 110a, 110b, forms an arc segment of a circle, although deviations from a perfect circular shape may provide similarly suitable function.

Guide portions 120a and 120b may be connected to lateral extensions 110a and 110b via connecting portions 150a and 150b, respectively. Although described as separate components, it should be understood that center portion 110, guide portions 120a, 120b, and connecting portions 150a, 150b may all be formed as a single integral member or separate members coupled together by adhesives, welding, etc. Guide portions 120a and 120b are positioned radially outward of lateral extensions 110a and 110b, respectively. With this configuration, sleeve guide slots 160a, 160b, which extend the longitudinal length L, are formed between guide portion 120a and lateral extension 110a, and between guide portion 120b and lateral extension 110b, respectively. Sleeve guide slots 160a, 160b are bounded on a first end (the "top" in the view of FIG. 2B) by connecting portions 150a, 150b respectively, and are open on the other end (the "bottom" in the view of FIG. 2B). As best shown in FIG. 2B, a cross-section of guide members 120a and 120b each form an arc segment of a circle, although deviations from a perfect circular shape may provide similarly suitable function.

A variety of exemplary dimensions for portions of tool 100 are described immediately below. However, it should be understood that such dimensions are merely exemplary and may be varied without deviating from the inventive concept. For example, the exemplary dimensions may vary depending on the particular cables and/or split sleeve used with tool 100. In addition, it should be understood that, in the illustrated embodiment, tool 100 may be symmetrical about a longitudinal plane extending through center of tool 100 and through the center of cable slot 140. The width D1 of cable slot 140 may be between about 2 mm and about 5 mm, such as about 3.5 mm. When lateral extensions 110a and 110b form arc segments of a circle, an inner wall of the lateral extensions may have a radius of curvature R1 of about 5.5 mm, with the outer wall having a radius of curvature R2 of about 7.5 mm. Thus, the wall thickness of lateral extensions 110, 110b may be about 2 mm. When guide portions 120a, 120b form arc segments of a circle, an inner wall of the guide portions may have a radius of curvature R3 of about 9 mm, with the outer wall having a radius of curvature R4 of about 11 mm. Thus, the wall thickness of guide portions 120a, 120b may be about 2 mm, with the width of sleeve guide slots 160a, 160b being about 1.5 mm. In addition, in the illustrated embodiment, the terminal ends 121a, 121b of guide portions 120a and 120b, and a surface 131 of bottom end of center portion 110, may all terminate at or near a single plane P1.

Figure 3A:
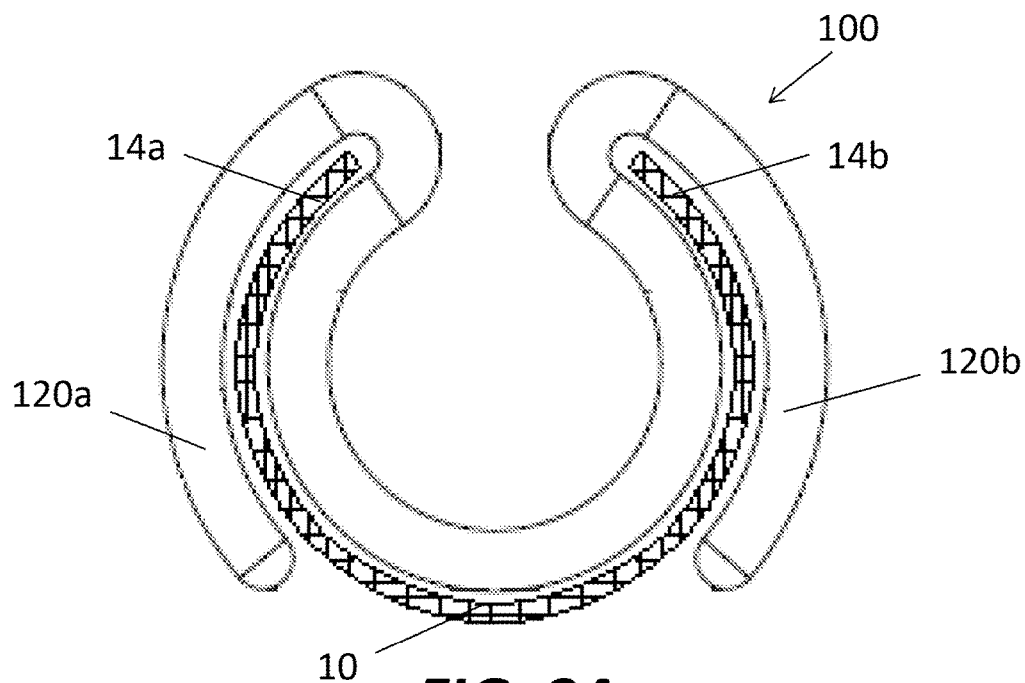
FIG. 3A is a transverse cross-section of the tool of FIG. 2A with the split sleeve of FIGS. 1A-C assembled thereto.
Figure 3B:
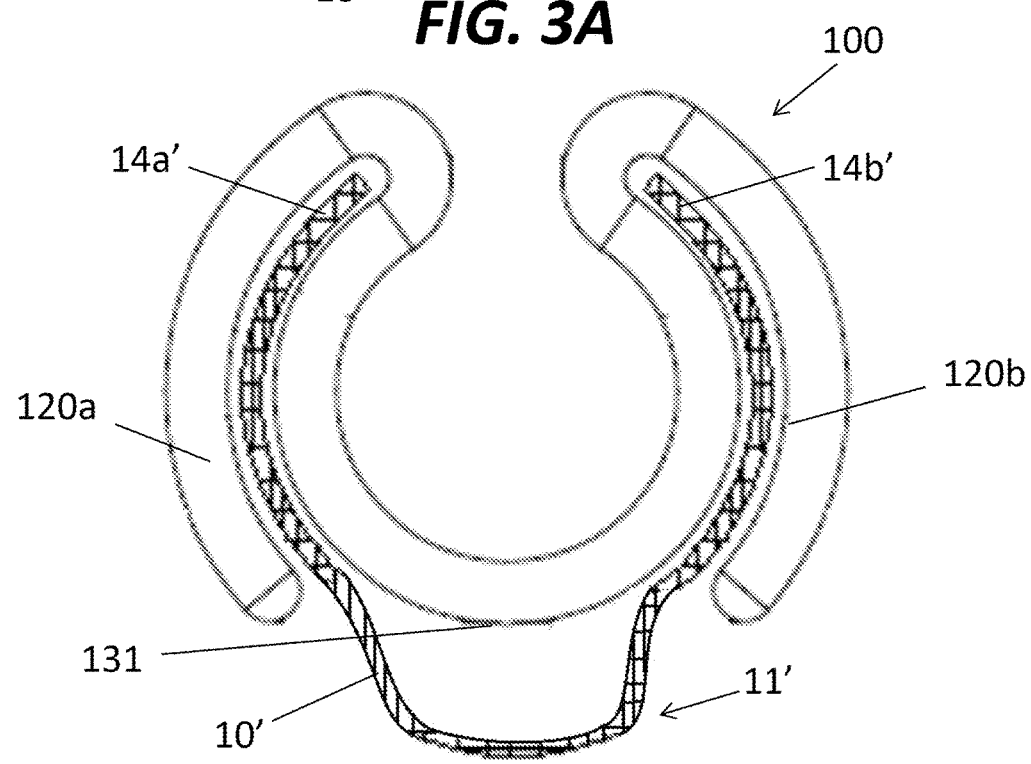
FIG. 3B is a transverse cross-section of the tool of FIG. 2A assembled to a split sleeve wider than that shown in FIGS. 1A-C.

FIG. 3A illustrates a cross-section of tool 100 assembled to a portion of split sleeve 10, the portion of the split sleeve being held by the tool in the partially relaxed condition similar to that shown in FIG. 1B. In particular, a portion of split sleeve 10 may be assembled to tool 100 by sliding side 14a into guide slot 160a and side 14b into guide slot 160b, with a longitudinally extending center portion of the split sleeve between the sides 14a, 14b remaining exposed between terminal ends 121a, 121b of guide portions 120a, 120b. Stated another way, at least a portion of the split sleeve, namely, the longitudinally extending center portion, is not disposed within an interior region of the tool 100 defined by portions of the tool 100. As noted above in connection with FIG. 2, the terminal ends of guide portions 120a and 120b, and the bottom end of center portion 110, may all be positioned to terminate at a single plane P1. This configuration desirably may provide that guide portions 120a and 120b are of sufficient arcuate length extending from the connecting portions 150a and 150b to the terminal ends thereof so that the split sleeve 10 may be easily assembled in engagement with tool 100, when split sleeve 10 is assembled to tool 100, and furthermore the tool remains assembled to split sleeve during use. If the guide portions 120a and 120b do not have a sufficient arcuate length extending from the connecting portions 150a and 150b, for example, split sleeve 10 may easily slip out of engagement with tool 100 during use. However, if guide portions 120a and 120b have an arcuate length extending from the connecting portions 150a such that a distance D2 between the terminal ends is less than a predetermined distance related to a transverse dimension of the split sleeve 10, it might be difficult to assemble tool 100 to split sleeve 10. In one embodiment, the tool 100 may be configured such that a distance D2 between the terminal ends 121a, 121b is sized so split sleeves 10 having different transverse dimensions T may be used with tool 100. For example, as shown in FIG. 3B, if a split sleeve 10' similar to split sleeve 10 is assembled to tool 100, with the split sleeve having a larger transverse dimension extending from the side 14a' to the side 14b' than the dimension T, a central longitudinally extending portion 11' of split sleeve 10', which is attributable to the difference between the transverse dimensions, may extend remotely from the central portion the open space between the terminal ends of guide portions 120a, 120b. As such, in the embodiment involving the split sleeve 10', the portion 11' may not extend on or substantially along the surface 131 of the bottom end of the central portion 110.

Referring again to FIG. 3A, with tool 100 maintaining the portion of split sleeve 10 in the partially relaxed condition, the lumen of the split sleeve is substantially concentric with the lumen 130 of tool 100. Similarly, the opening 16 of split sleeve 10 is aligned longitudinally with cable slot 140 of tool 100. As is described in greater detail below, one or more cables may be inserted into the lumen 130 of tool 100, as well as the lumen of split sleeve 10, when the split sleeve is assembled to the tool as shown in FIG. 3A.

Figure 4:
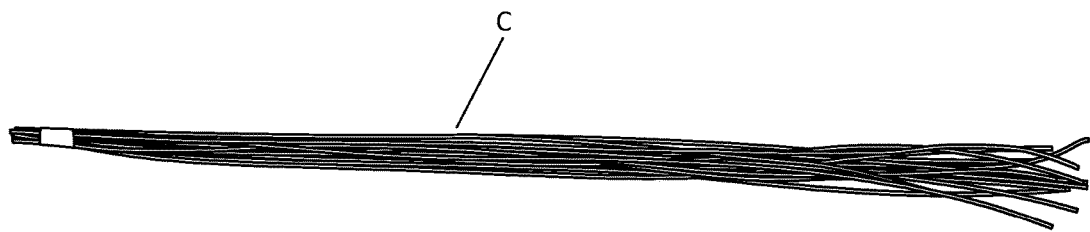
FIG. 4 is a perspective view of a plurality of cables.

FIG. 4 illustrates a plurality of cables C that may be used in conjunction with tool 100 and split sleeve 10. It should be understood that, unless explicitly described otherwise, the use of the term "cable" or "cables" may refer to either a single cable or a plurality of cables, although tool 100 may be most useful for a system with a plurality of cables C. Although cables C are shown isolated from any other system, the environment for using tool 100 and split sleeve 10 may generally be one in which one or both ends of each of the plurality of cables C are installed into other components.

Figure 5A:
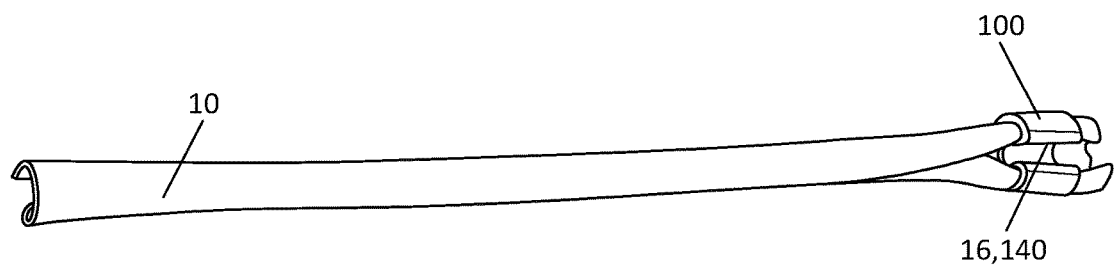
FIG. 5A is a top perspective view of the tool of FIG. 2A assembled to the split sleeve of FIGS. 1A-C.

FIG. 5A is a top perspective view of split sleeve 10 with tool 100 assembled to terminal end 12b of the split sleeve. The portion of split sleeve 10 assembled to tool 100 is shown and discussed above in connection with FIG. 3A. FIG. 5A illustrates that the portion of split sleeve 10 assembled to tool 100 is in the partially relaxed condition (FIG. 1B), whereas the remainder of split sleeve 10 is in the fully relaxed condition (FIG. 1C). As shown in FIG. 5A, when tool 100 is assembled to terminal end 12b of split sleeve 10, that terminal end of the split sleeve provides an opening 16 through which cables C may be inserted, while the remainder of the split sleeve is closed because sides 14a and 14b of the split sleeve contact or overlap one another.

Figure 5B:
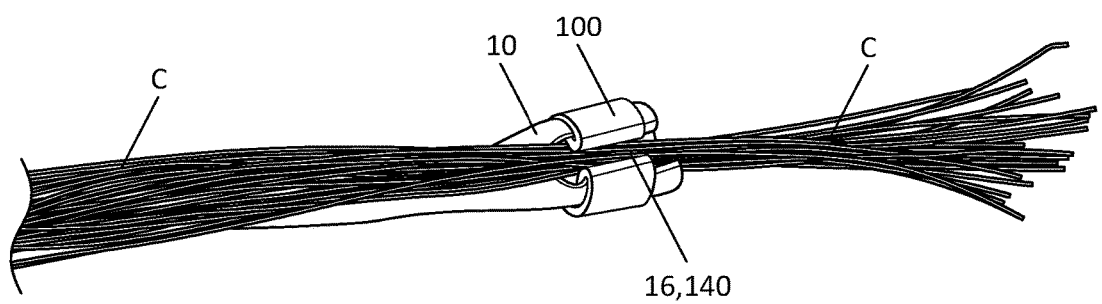
FIGS. 5B-D are perspective views of the plurality of cables of FIG. 4 being inserted into the split sleeve of FIGS. 1A-C with the tool of FIG. 2A in different stages.

FIG. 5B is an enlarged top perspective view of the portion of split sleeve 10 at the terminal end 12b assembled to tool 100 (shown in FIG. 5A), with a portion of the plurality of cables C positioned within the lumen 130 after having been moved through the opening 16 of the split sleeve and the cable slot 140 of the tool. As shown in FIG. 5B, in this configuration, a majority of the lengths of the cables C is positioned outside split sleeve 10. Once a portion of the plurality of cables C is initially moved through opening 16 and cable slot 140, a user may grip the terminal end 12b of split sleeve 10 (and cables C positioned therein) with one hand, and grip tool 100 in the other hand. The user may then slide tool 100 toward the other terminal end 12a of split sleeve 10.

Figure 5C:
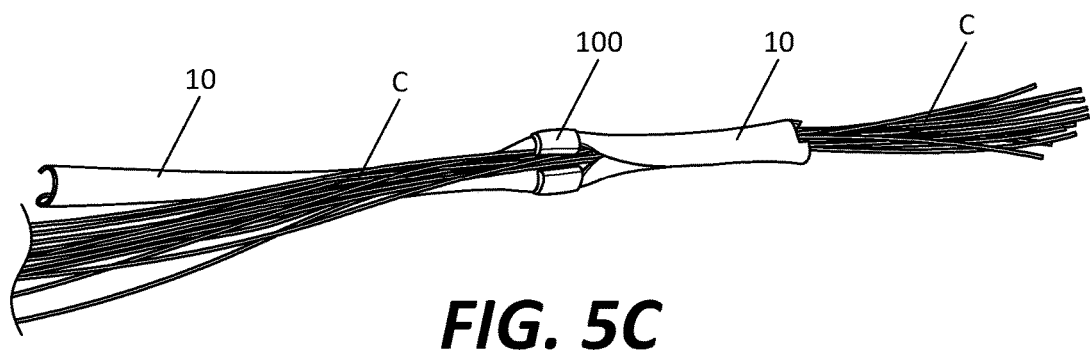

FIG. 5C illustrates the system with tool 100 positioned along the length of split sleeve 10 after being slid in the direction of the terminal end 12a, as described above. As can be seen, as tool 100 slides along the length of split sleeve 10, the portions of the split sleeve no longer assembled to tool 100, in other words, no longer engaged with tool 100, revert back to the fully relaxed condition, such that the split sleeve completely surrounds, so as to enclose within the lumen thereof, lengths of the cables C that extend away from the terminal end 12a in a direction opposite to the direction the tool 100 is slid. During the sliding motion, it may be preferable for a user to keep a finger overlying opening 16 and cable slot 140 to guide the cables C through the opening and cable slot, although this may not be necessary in all cases.

Figure 5D:
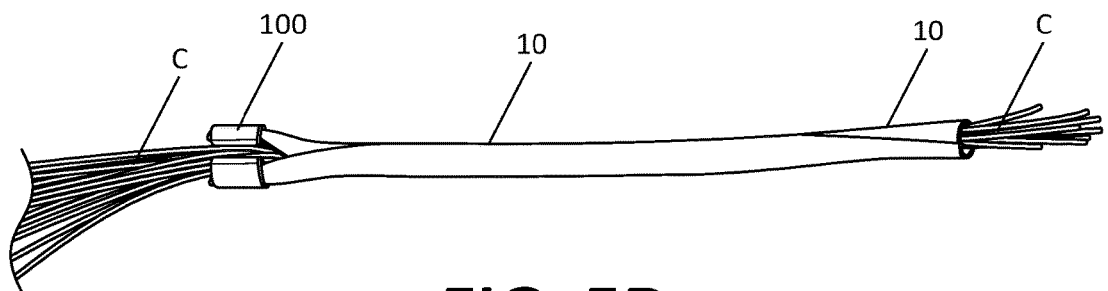

As the user continues sliding tool 100 along the length of the split sleeve 10, additional lengths of cable C may be guided into the lumen of the split sleeve. The process is continued until tool 100 is reaches the other terminal end 12a of split sleeve 10, as shown in FIG. 5D. At this position, substantially the entire longitudinal length of the lumen of split sleeve 10 has lengths of cables C positioned therein, thereby providing that such lengths of cables C are enclosed within an interior of the split sleeve. In the illustrated condition, the portions of the plurality of cables C within the lumen of split sleeve 10 are neatly and securely organized. It should be understood that split sleeve 10 may be provided in any desired length to secure any desired length of cables C therein. With the system and methods described above, it should be understood that a plurality of split sleeves 10 and a plurality of corresponding tools 100 may be applied to a system incorporating multiple pluralities of cables C, so that each plurality of cables C may be quickly organized and secured within a respective split sleeve 10 using a corresponding tool 100. At a later time, if one or more of the plurality of cables C require maintenance, replacement, or re-routing, a user may easily pull the cables C out of split sleeve 10 by applying enough force to the cables to overcome the split sleeve's tendency to remain with the sides rolled upon each other. The cables C may then be secured again within split sleeve 10 by repeating the procedures described above. With the general aspects of the invention described above, a number of additional features and variations are provided below.

Figures 6A, 6B, 6C:
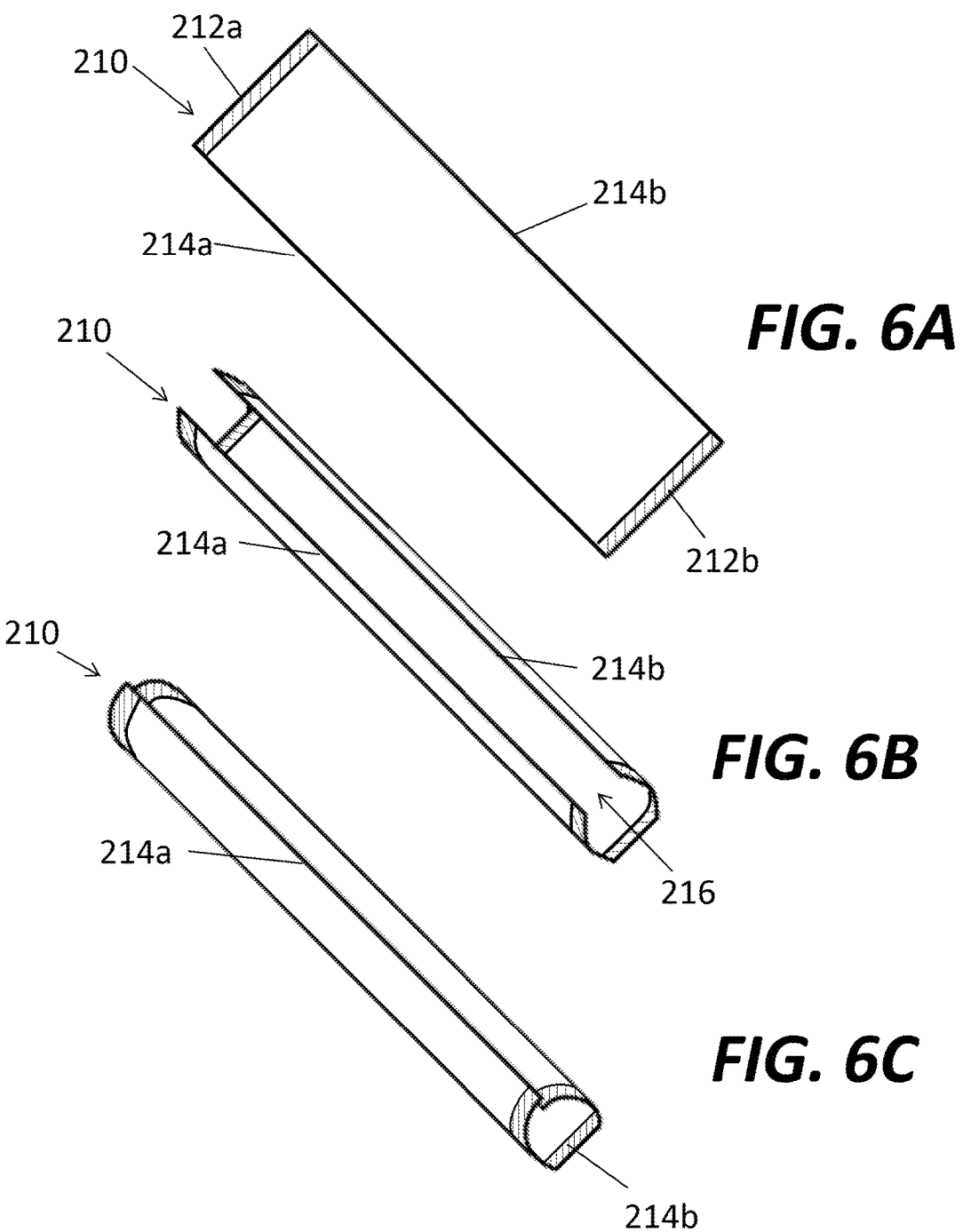
FIG. 6A is a perspective view of an embodiment of a split sleeve laid out flat according to the disclosure.
FIG. 6B is a perspective view of the split sleeve of FIG. 6A in a partially relaxed condition.
FIG. 6C is a perspective view of the split sleeve of FIG. 6A in a fully relaxed condition.

An alternate embodiment of a split sleeve 210 is illustrated in FIGS. 6A-C. Split sleeve 210 may be similar to split sleeve 10 in nearly all respects, with particular exceptions noted below. For example, split sleeve 210 may by substantially rectangular when laid out flat, extending longitudinally from a first terminal end 212a to a second terminal end 212b, and transversely from a first side 214a to a second side 214b. Similar to split sleeve 10, split sleeve 210 may be shape set so that, in the absence of externally applied forces, split sleeve 210 takes the form shown in FIG. 6C, with first side 214a overlying second side 214b. Applying force to pull apart sides 214a, 214b may create an opening 216 for insertion of cables C. Split sleeve 210 may interact with tool 100 identically in all manners described above in connection with split sleeve 10, with the exception described below.

One or both terminal ends 212a, 212b may be thicker than the remainder of split sleeve 210. This embodiment may be accomplished in any suitable manner, for example by crimping terminal end 212a over itself, and crimping terminal end 212b over itself, or by attaching additional strips of material to the terminal ends. The enlarged thickness is denoted in FIGS. 6A-C with hatching. With tool 100 assembled to split sleeve 210, the user installs cables C into the lumen of the split sleeve in the same manner described in connection with FIGS. 5A-D. However, the thicker terminal end portions 212a, 212b, provide for a stop so that it is difficult or impossible for tool 100 to slide off the thicker terminal end. In the example provided above in which sleeve guide slots 160a, 160b of tool 100 are about 1.5 mm, the terminal end portions 212a, 212b are preferably greater than about 1.5 mm.

With split sleeve 210 described above, each split sleeve provided for a system preferably includes a dedicated tool 100. Once a sleeve 210 and corresponding tool 100 have been installed over a particular plurality of cables C, the tool 100 remains assembled to sleeve 210. If, at a later time, maintenance, replacement, or re-routing of the cables C is required, tool 100 is still assembled to split sleeve 210 because it would not have slipped off the end of the split sleeve 210, either intentionally or unintentionally. The thick terminal ends 212a and 212b of split sleeve 210 effectively guarantees that a dedicated tool 100 is always coupled to the split sleeve and is thus always available for quickly and easily securing the cables C within the split sleeve whenever desired. Still further, this configuration may facilitate the ability to provide sleeve 210 and tool 100 to a user already assembled to one another, without risking that the tool 100 becomes disassembled from the split sleeve 210. This avoids the situation of forcing the user to assemble the tool 100 to the split sleeve 210 in the first place.

Figure 7A:
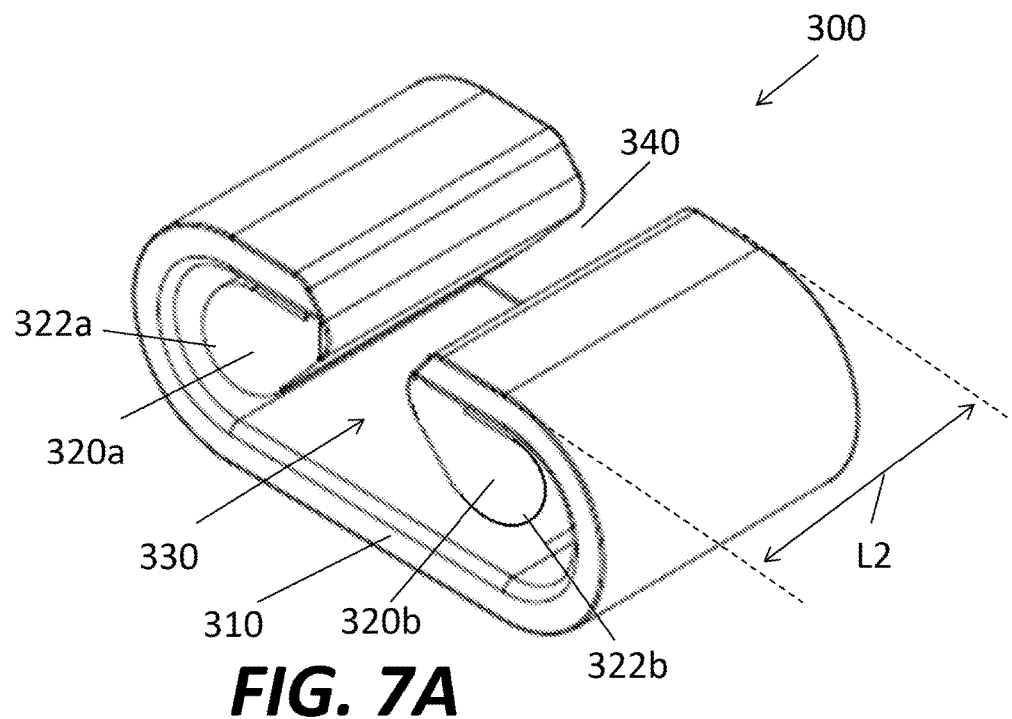
FIG. 7A is a perspective view of another embodiment of a tool for installing cables in a split sleeve according to the disclosure.
Figure 7B:
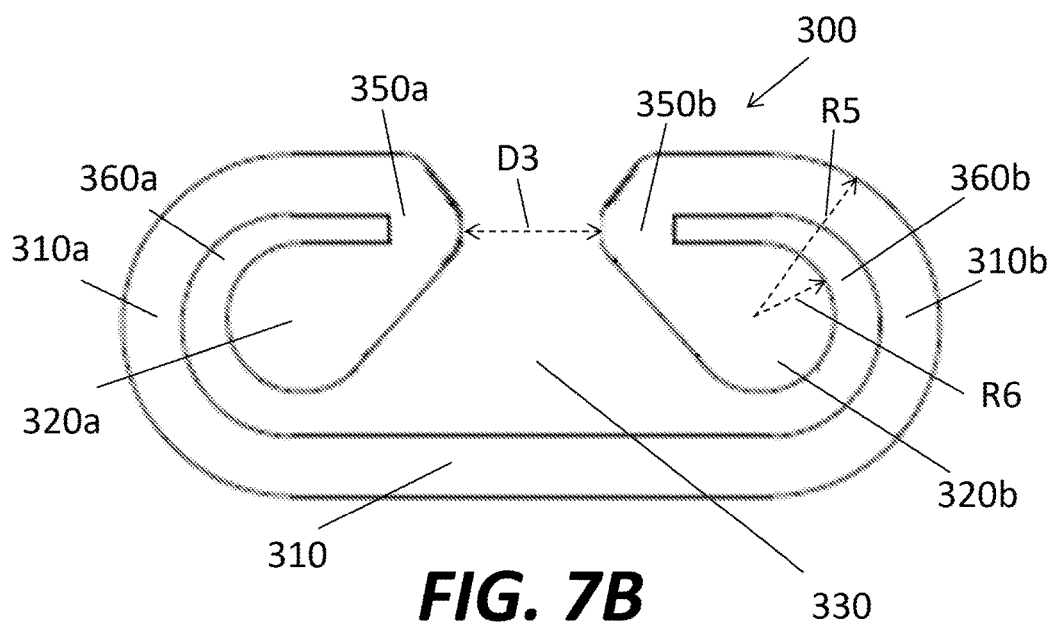
FIG. 7B a transverse cross-section of the tool of FIG. 7A.

FIGS. 7A-B show another embodiment of a tool 300 for installing cables into a split sleeve, such as split sleeves 10 or 210 described above. Tool 300 includes an outer portion 310 and lateral guide portions 320a, 320b connected to and positioned radially inward of the outer portion. Outer portion 310 defines a lumen 330 extending longitudinally through the outer portion. Outer portion 310 may be in the form of an open tube in the general shape of a "U" or "C", including lateral extensions 310a, 310b. Lateral extensions 310a, 310b are joined to each other at one end (the substantially flat "bottom" end in the view of FIG. 7B) but not at the other end (the "top" end in the view of FIG. 7B). At the end at which lateral extensions 310a, 310b are not joined, a cable slot 340 is defined, the slot extending a length coextensive with the longitudinal dimension L2 of outer portion 310, the slot being in communication with lumen 330. As best shown in FIG. 7B, a cross-section of lateral extensions 310a, 310b, may each form an arc segment of a circle, although deviations from a perfect circular shape may provide similarly suitable function. In the illustrated embodiment, the outer wall of lateral extensions 310a, 310b may have a radius of curvature R5 of between about 4 mm and about 7 mm, for example about 6 mm.

Guide portions 320a and 320b may be connected to lateral extensions 310a and 310b via connecting portions 350a and 350b, respectively. Although described as separate components, it should be understood that outer portion 310, guide portions 320a, 320b, and connecting portions 350a, 350b may all be formed as a single integral member or separate members coupled together by adhesives, welding, etc. Guide portions 320a and 320b flare from connecting portions 350a, 350b back toward lateral extensions 310a, 310b, respectively, and are positioned radially inward of the lateral extensions. End portions 322a and 322b of guide portions 320a and 320b may be substantially circular, although they need not form a perfect circle. In the illustrated embodiment, the end portions 322a and 322b of guide portions 320a and 320b may have a radius of curvature between about 2 mm and about 3 mm, for example about 2.5 mm. With this configuration, sleeve guide slots 360a, 360b are defined between guide portion 320a and lateral extension 310a, and between guide portion 320b and lateral extension 310b, respectively. Sleeve guide slots 360a and 360b may provide a generally similar function as sleeve guide slots 160a and 160b of tool 100. For example, sleeve guide slots 360a, 360b are bounded on a first end (the "top" in the view of FIG. 7B) by connecting portions 350a, 350b respectively.

A variety of exemplary dimensions for portions of tool 300 are described immediately below. However, it should be understood that such dimensions are merely exemplary and may be varied without deviating from the inventive concept. For example, the exemplary dimensions may vary depending on the particular cables and/or split sleeve used with tool 300. In addition, it should be understood that, in the illustrated embodiment, tool 300 may be symmetrical about a longitudinal plane extending through center of tool 300 and through the center of cable slot 340. The width D3 of cable slot 340 may be between about 7 mm and about 11 mm, such as about 9 mm. The width of sleeve guide slots 360a, 360b may be between about 1 mm and about 2 mm, such as about 1.5 mm.

Figure 8:
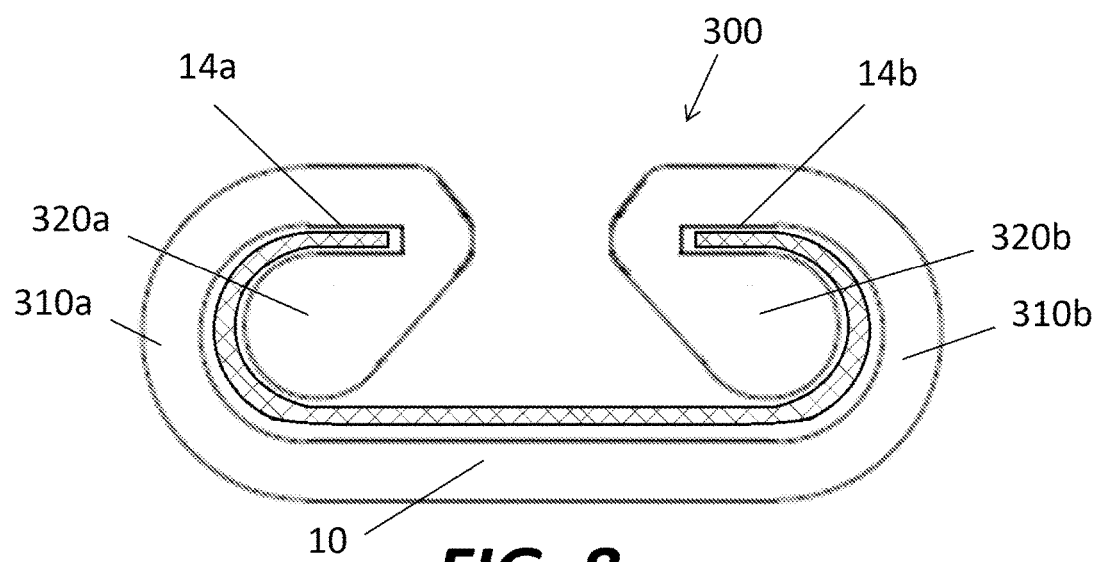
FIG. 8 is a transverse cross-section of the tool of FIG. 7A with the split sleeve of FIGS. 1A-C assembled thereto.

FIG. 8 illustrates a cross-section of tool 300 assembled to a portion of split sleeve 10, the portion of the split sleeve being held by the tool in the partially relaxed condition similar to that shown in FIG. 1B. In particular, a portion of split sleeve 10 may be assembled to tool 300 by sliding side 14a into guide slot 360a and side 14b into guide slot 360b. A major difference between tool 100 and tool 300 is that, with the illustrated configuration of tool 300, the portion of split sleeve 10 assembled to tool 300 is effectively entirely within an interior region defined by the tool 300, whereas for the tool 100 at least one portion of the split sleeve is external to any interior region defined by the tool 100. The benefit of the configuration of tool 300 is that it is nearly impossible for split sleeve 10 and tool 300 to become unintentionally disassembled. Unlike with tool 100, however, there is a limited range of sizes of split sleeves that can be assembled to tool 300. For example, if a user attempted to assemble a split sleeve that had a longer transverse dimension from first side 14a to second side 14b than that shown in FIG. 8, the extra length of the transverse dimension may extend upwardly toward and through cable slot 340, which may reduce the ability to effectively insert cables C through the guide slot into the lumen 330. Otherwise, the procedure for using tool 300 to position a plurality of cables within a split sleeve assembled to the tool 300, such as split sleeve 10 or 210, is substantially identical to the procedure described above in connection with tool 100.

Figure 9:
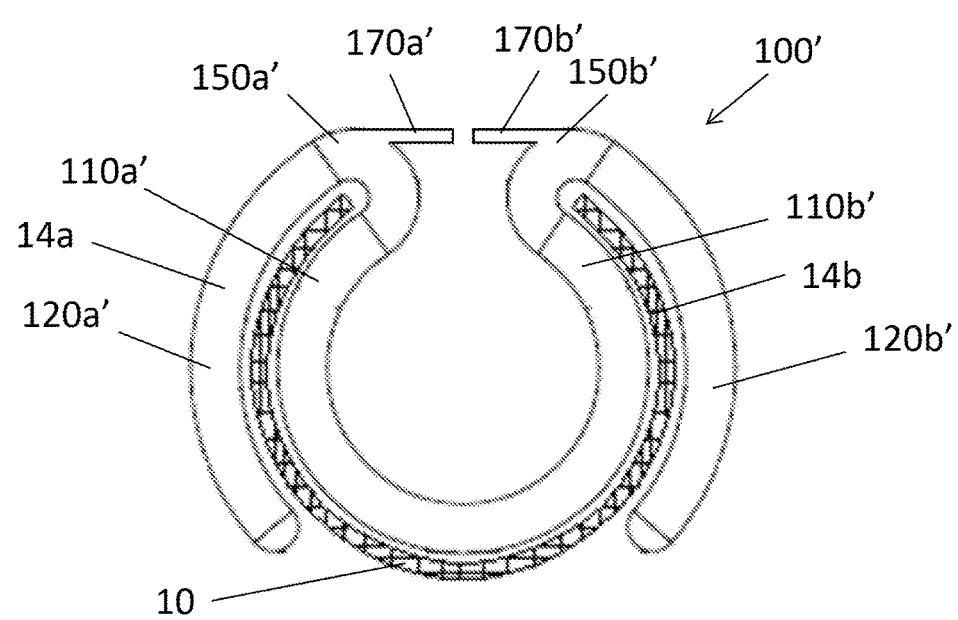
FIG. 9 is an alternate embodiment of the tool of FIG. 2A with added flaps according to the disclosure, the tool being assembled to the split sleeve of FIGS. 1A-C.

FIG. 9 illustrates alternate embodiments of tool 100 with an added resilient flap system. FIG. 9 illustrates a cross-section of tool 100' assembled to a portion of split sleeve 10, tool 100' being identical to tool 100 in most respects. For example, tool 100' may include lateral portions 110a', 110b' connected to guide portions 120a', 120b' via connecting portions 150a', 150b', respectively. In addition, first and second flaps 170a', 170b' may be coupled to and extend from connection portions 150a', 150b', the first and second flaps extending toward each other. Although a gap is illustrated between first and second flaps 170a', 170b', the flaps may alternatively come into contact with one another, or even overlap one another a small amount, but in all cases the flaps 170a', 170b' are not directly coupled to one another. In another embodiment, a single flap 170 may extend from one connection portion 150a or 150b toward the other connection portion 150a or 150b.

In the procedure described above with respect to tool 100 for positioning the plurality of cables C within the lumen 130 of tool 100, it may be desirable for a user to hold a finger over the cable slot 140 to help press or force the cables C into the split sleeve 10 as the tool 100 slides with respect to the split sleeve. With tool 100', flaps 170a', 170b' (or a single flap) effectively may satisfy this function. In other words, with the illustrated configuration, cables C may be positioned in the lumen of the tool by pressing the cables against the flaps to cause the flaps 170a', 170b' to bend inwardly toward the lumen, and then continuing to press the cables through the cable slot into the lumen of tool 100'. Preferably, the flaps 170a' and 170b' are resilient enough to deflect downward to allow passage of the cables C upon application of an intentional force by a user. However, flaps 170a' and 170b' should be stiff enough so that, as tool 100' slides with respect to split sleeve 10, the cables C cannot exit the tool through the flaps 170a', 170b' unintentionally. The size of the gap—if any—between flaps 170a', 170b' should also be small enough to help resist the cables C from unintentionally exiting the tool 100' during use. Flaps 170a', 170b' may be formed of the same material as tool 100' and be integral therewith. However, if other material properties are desired, flaps 170a', 170b' may be formed as separate members of other material and coupled to tool 100', for example via adhesives. It should be understood that similar or identical flaps may be provided in an alternate embodiment of tool 300 to provide the same functionality as described in relation to flaps 170a', 170b'.

It is to be understood that a similar resilient flap system as described for the tool 100 may be provided for the tool 300 at the cable slot opening 340.

Figure 10A:
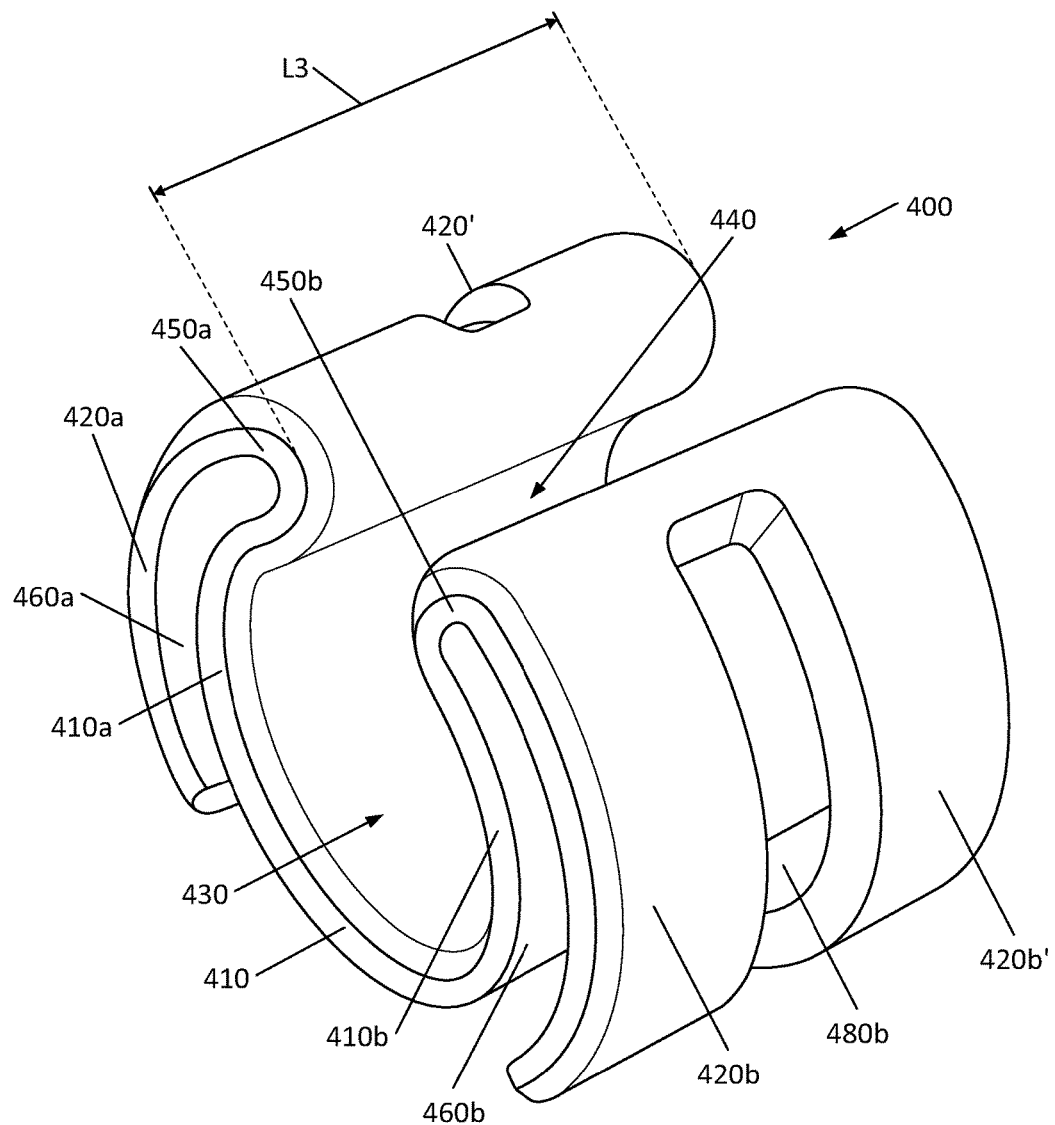
FIG. 10A is a perspective view of a further embodiment of the tool of FIG. 2A according to the disclosure.

FIG. 10A illustrates another embodiment of a tool 400 similar to tool 100 in certain respects. Tool 400 may have a similar or identical shape as tool 100 in a transverse cross-sectional view. For example, tool 400 includes a center portion 410 and lateral guide portions connected to and positioned radially outward of the center portion. In addition, the tool 400 may include two pairs of lateral guide portions, with lateral guide portions 420a and 420a' on a first side of the tool and lateral guide portions 420b and 420b' on a second side of the tool. Guide portions 420a and 420a' are spaced apart from one another and define a slot 480a (not labeled in FIG. 10A) therebetween, with guide portions 420b and 420b' defining a slot 480b therebetween. Slots 480a and 480b are described in greater detail in connection with FIGS. 10B-C below. Center portion 410 defines a lumen 430 extending a length L3 coextensive with a longitudinal dimension of the center portion. Center portion 410 may be in the form of an open tube in the general shape of a "U" or "C", including lateral extensions 410a, 410b. Lateral extensions 410a, 410b are joined to one another at one end (the "bottom" end in the view of FIG. 10A) but not at the other end (the "top" end in the view of FIG. 10A). At the end at which lateral extensions 410a, 410b are not joined, a cable slot 440 is defined, the slot running longitudinally along a wall of center portion 410, the slot extending longitudinally the length L3 of center portion 410, the slot being in communication with lumen 430.

Pairs of guide portions 420a, 420a' and 420b, 420b' may be connected to lateral extensions 410a and 410b via connecting portions 450a and 450b, respectively. Although described as separate components, it should be understood that center portion 410, guide portions 420a, 420a', 420b, 420b', and connecting portions 450a, 450b may all be formed as a single integral member or separate members coupled together by adhesives, welding, etc. Guide portions 420a, 420a' and 420b, 420b' are positioned radially outward of lateral extensions 410a and 410b, respectively. With this configuration, substantially similar to tool 100, sleeve guide slots 460a, 460b are formed between guide portions 420a, 420a' and lateral extension 410a, and between guide portions 420b, 420b' and lateral extension 410b, respectively. Sleeve guide slots 460a, 460b are bounded on a first end (the "top" in the view of FIG. 10A) by connecting portions 450a, 450b respectively, and are open on the other end (the "bottom" in the view of FIG. 10A).

Figure 10B:
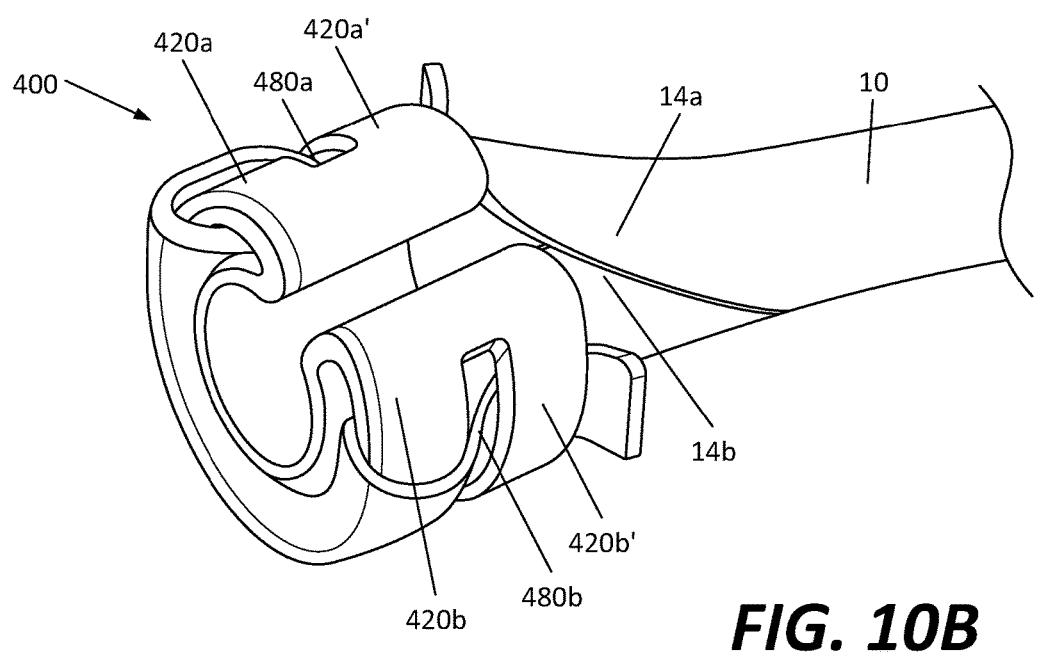
FIG. 10B is a perspective view of the tool of FIG. 10A assembled to a terminal end of the split sleeve of FIGS. 1A-C.
Figure 10C:
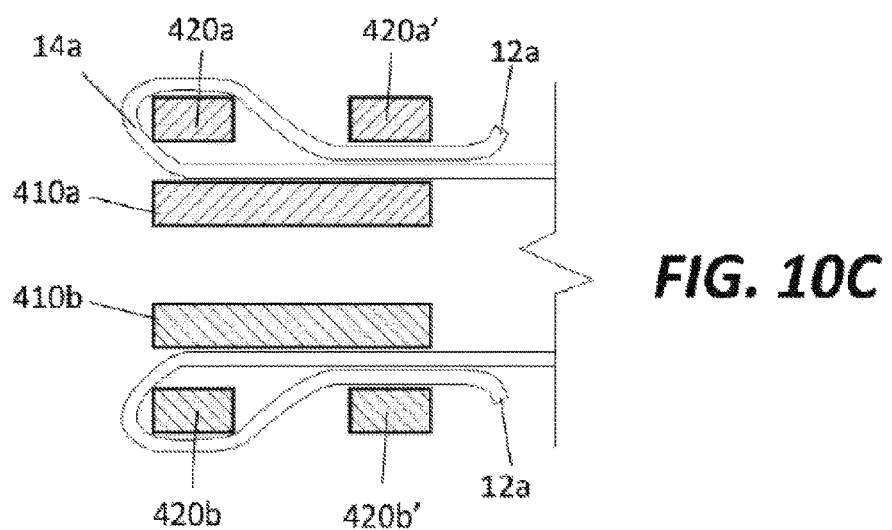
FIG. 10C is a transverse cross-section of the tool 400 of FIG. 10A assembled to a terminal end of the split sleeve of FIGS. 1A-C as shown in FIG. 10B.

As should be clear from the above description, tool 400 is able to interact with a split sleeve such as split sleeve 10 or 210 in substantially the same manner as tool 100 in order to position a plurality of cables C within the split sleeve assembled to tool 400. Also, tool 400' may provide for additional functionality by acting as a "stop" at one or both ends of a split sleeve, to provide a similar functionality as provided by the thickened terminal ends 212a, 212b of split sleeve 210. For example, FIG. 10B shows a top perspective view of tool 400 assembled to a terminal end 12a of split sleeve 10. In particular, side 14a of terminal end 12a extends between lateral extension 410a and both guide portions 420a, 420a', so that the terminal end 12a is positioned beyond tool 400. The terminal end 12a of side 14a may then be wrapped back around and pulled through slot 480a. In other words, one portion of side 14a split sleeve 10 is positioned radially outwardly of guide portion 420a, and another portion is sandwiched between guide portion 420a and lateral extension 410a. Two portions of side 14a of split sleeve 10 spaced from each other longitudinally along the length of the split sleeve are in contact with one another and sandwiched between guide portion 420a' and lateral extension 410a. This configuration is also illustrated in FIG. 10C. The process is repeated with side 14b of terminal end 12a, passing the split sleeve 10 between both guide portions 420b, 420b', then wrapping the split sleeve back around guide portion 420b and then between guide portion 420b' and lateral extension 410b. With this configuration, the frictional interaction of respective portions of sides 14a and 14b with each other and portions of tool 400 effectively lock tool 400 to terminal end 12a of split sleeve 10. One tool 400 may be provided on terminal end 12a of split sleeve 10, with another tool 400 provided on terminal end 12b of split sleeve 10. A third tool 400 may be assembled to a middle portion of split sleeve 10 to provide for sliding functionality with split sleeve 10 to position cables C therein. This configuration provides for a single device structure that can function as a stopper on one or both ends of split sleeve 10, and which can also provide the sliding functionality to position cables within the split sleeve 10. It should be understood that tool 400 may be used only as a stopper or one or both ends of split sleeve 10, while using any of the tools described above for the sliding functionality. Also, tool 400 can be used solely for its sliding functionality with split sleeve 10 or 210.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims. For example, features of one embodiment described above may be combined with features of other embodiments without departing from the scope of the invention.

The invention claimed is:

1. A system for securing one or more cables, comprising:
   a split sleeve extending longitudinally from a first terminal end to a second terminal end and transversely from a first side to a second side, the split sleeve being biased to a configuration in which the first side at least partially overlies the second side in the absence of externally applied force; and
   a tool configured to be assembled to the split sleeve, the tool having:
   a center portion having first and second arcuate lateral extensions;
   a first arcuate guide portion positioned radially outward of the first lateral extension, the first guide portion and first lateral extension forming a first guide slot therebetween; and
   a second arcuate guide portion positioned radially outward of the second lateral extension, the second guide portion and second lateral extension forming a second guide slot therebetween,
   wherein, when the split sleeve is assembled to the tool, the first guide slot is configured to slide along the first side of the split sleeve and the second guide slot is configured to slide along the second side of the split sleeve.

2. The system of claim 1, wherein the first guide portion is connected to the first lateral extension by a first connection portion, and the second guide portion is connected to the second lateral extension by a second connection portion.

3. The system of claim 2, wherein, when the tool is assembled to the split sleeve, a portion of the first side of the split sleeve is positioned adjacent the first connection portion, and a portion of the second side of the split sleeve is positioned adjacent the second connection portion.

4. The system of claim 3, wherein, when the tool is assembled to the split sleeve, a portion of the split sleeve between the first and second sides is bounded on only one side by the tool.

5. The system of claim 3, wherein, when the tool is assembled to the split sleeve, a cable slot is defined between the first and second connection portions and extends between the portions of the first and second sides of the split sleeve, and the cable slot for receiving one or more cables therethrough.

6. The system of claim 5, further comprising:
at least one resilient flap extending away from at least one of the first connection portion or the second connection portion.

7. The system of claim 6, wherein the at least one flap is configured to deflect toward or away from the cable slot.

8. The system of claim 6, wherein the at least one resilient flap includes a first resilient flap extending from the first connection portion toward the second connection portion and a second resilient flap extending from the second resilient flap extending from the second connection portion toward the first connection portion, wherein the first and second resilient flaps are not coupled to each other within the cable slot.

9. The system of claim 1, wherein the first terminal end of the split sleeve has a first thickness, the second terminal end of the split sleeve has a second thickness, and a middle portion of the split sleeve between the first and second terminal ends has a third thickness, the first and second thickness being greater than the third thickness.

10. The system of claim 9, wherein the first and second guide slots each have a width greater than the third thickness and less than the first and second thicknesses.

* * * * *